US008508575B2

(12) United States Patent
Noethlings et al.

(10) Patent No.: US 8,508,575 B2
(45) Date of Patent: Aug. 13, 2013

(54) TELEVISION SYSTEM, TELEVISION SET AND METHOD FOR OPERATING A TELEVISION SYSTEM

(75) Inventors: Rolf Noethlings, Stuttgart (DE); Carsten Merkle, Pluederhausen (DE)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 13/074,499

(22) Filed: Mar. 29, 2011

(65) Prior Publication Data

US 2011/0242269 A1  Oct. 6, 2011

(30) Foreign Application Priority Data

Mar. 31, 2010  (EP) .................................... 10003629

(51) Int. Cl.
*H04N 7/15*  (2006.01)
(52) U.S. Cl.
USPC .................. 348/14.08; 348/14.09; 348/14.12; 348/14.05
(58) Field of Classification Search
CPC ....................................................... H04N 7/15
USPC .......................................... 348/14.01–14.16
See application file for complete search history.

(56) References Cited

U.S. PATENT DOCUMENTS

| | | | |
|---|---|---|---|
| 6,292,210 B1 * | 9/2001 | Gerszberg et al. | ......... 348/14.01 |
| 6,560,469 B1 | 5/2003 | Kim et al. | |
| 7,266,834 B1 | 9/2007 | Lund et al. | |
| 2007/0070188 A1 * | 3/2007 | Shyu | .......................... 348/14.11 |
| 2007/0156813 A1 * | 7/2007 | Galvez et al. | ................. 709/204 |
| 2007/0216759 A1 * | 9/2007 | Gonen et al. | ............... 348/14.01 |
| 2008/0157998 A1 | 7/2008 | Zuo et al. | |
| 2009/0284664 A1 | 11/2009 | Barry et al. | |

FOREIGN PATENT DOCUMENTS

JP  2008-219818  9/2008

OTHER PUBLICATIONS

TV Remote Control Comes with Built-in Speaker, http://www.cybertheater.com/tv-remote-control-comes-with-built-in-speaker, Mar. 1, 2009. 6 pages.
Remote Control with Microphone for psp 2000, http://www.himfr.com/d-p119151335908635225_Remote_Control_with., Aug. 19, 2008, 5 pages.
"DICIT Distant-talking Interfaces for Control of Interactive TV", Publishable Executive Summary Year 1, DICIT Consortium, Dec. 2, 2008, 5 pages.

* cited by examiner

*Primary Examiner* — Melur Ramakrishnaiah
(74) *Attorney, Agent, or Firm* — Oblon, Spivak, McClelland, Maier & Neustadt, L.L.P.

(57) ABSTRACT

A television system, comprising: a television set including a display and an input adapted to receive a television signal and a video conferencing signal, wherein the display is configured to display a television picture corresponding to the television signal and further configured to display a video conferencing picture of a video conference, the television set further including a first speaker adapted to output a audio signal of the video conference and a television sound signal included in said television signal, the television set further including a first microphone adapted to be used for said video conference; a remote control adapted to control the television set and including a second speaker and a second microphone; wherein the first speaker is adapted to output said audio signal and/or said television sound signal depending on a video conferencing mode; and wherein the second speaker is adapted to be switched on or off depending on said video conferencing mode; and wherein the first and second microphones are adapted to be selectively activated depending on said video conferencing mode.

15 Claims, 6 Drawing Sheets

TELEVISION SYSTEM, TELEVISION SET AND METHOD FOR OPERATING A TELEVISION SYSTEM

An embodiment of the invention relates to a television system. A further embodiment of the invention relates to a television set. A still further embodiment of the invention relates to a method for operating a television system.

BACKGROUND

Modern television systems include more and more functionalities that allow users to communicate in various ways.

BRIEF SUMMARY

It is an object of embodiments of the invention to provide a television system allowing users to communicate more freely and/or more convenient. It is a further object to provide a respective television set and method. These objects are solved by a television system, television set and method as defined in the independent claims.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
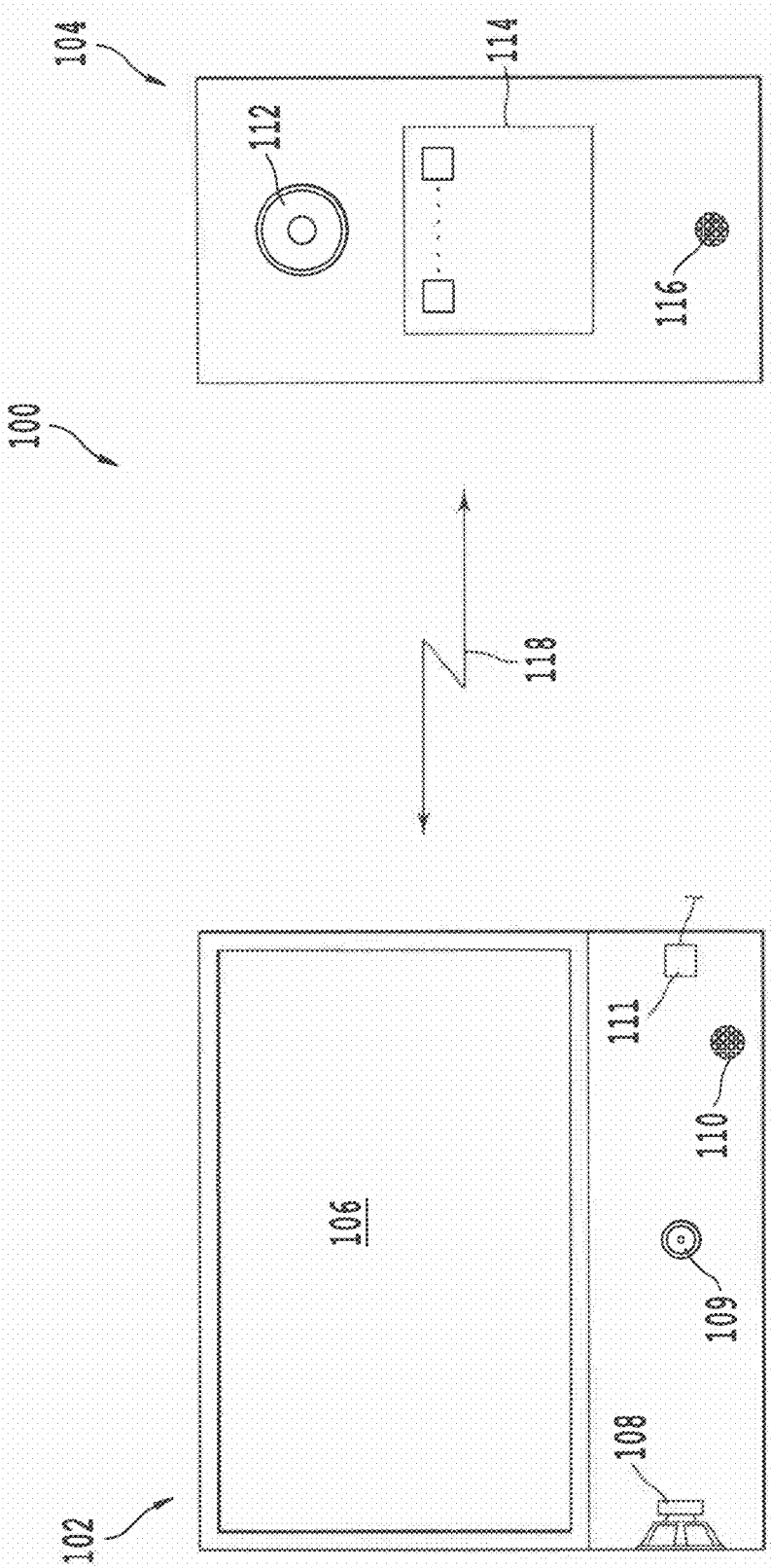
FIG. 1 shows an embodiment of a television system.

FIG. 1 shows a television system 100 according to an embodiment of the invention. Television system 100 comprises a television set 102 and a remote control 104.

Television set 102 comprises a display 106, a first speaker 108, a first microphone 110 and a transceiver 111. Remote control 104 comprises a second speaker 112, an input means 114, and a second microphone 116.

Television set 102 and remote control 104 are configured to communicate with each other via a wireless link 118. For example via wireless link 118 control signals may be transmitted from remote control 104 to television set 102, the control signal controlling certain functions television set 102. These control signals may be emitted from remote control 104 in response to a user operating input means 114. Moreover, via wireless link 118 an audio signal, e.g. of a video conference, may be transmitted from television set 102 to remote control 104 (see also below).

Via transceiver 111 the television set 102 may be connected to a cable and/or other channels via which television set 102 receives a television signal and a video conferencing signal. The television signal and video conferencing signal may be multiplexed. Alternatively, it is also possible that the television set 102 comprises a demodulator for demodulating television broadcast signals, e.g. received via cable, satellite and/or an antenna, and an interface or modem via which television set 102 may be connected to the internet or a telephone line. The telephone line may be a broadband telephone line, e.g. based on ISDN, DSL or any other suitable existing or upcoming new standard. The interface may connect television set 102 to the internet or telephone line via a wired or wireless connection. Via the internet connection a video conferencing signal may be transmitted/received, whereas via the television broadcast signal the television signal may be received and demodulated.

First speaker 108 is adapted to output a audio signal of a video conference held via television set 102 and/or a television sound signal included in a received television (broadcast) signal. First microphone 110 is adapted to be used for a video conference. In case of using television set 102 in a video conference, on display 106 the video conferencing picture may be displayed.

Television set 102 may further have a camera 109 which may be used for the video conference. Alternatively and/or additionally, remote control 104 may also have a camera which could be used for the video conference. In case both television set 102 and remote control 104 have a camera, the control which cameras are active could also depend on the video conferencing mode.

System 100 may be operated in different video conferencing modes. The term "video conferencing mode" relates to the kind of preferred usage of a user wishing to hold a video conference with television set 102 while continuing to view a currently viewed tv program. For example, the user may prefer to use remote control as a telephone receiver. Or the user may prefer to have the audio signal, e.g. audio signal, of the video conference to be output aloud via the first loudspeaker 108. The term "video conferencing mode" may therefore also be referred to an output mode for audio signals of the videoconference and/or an output mode for the television sound signal. Further, the term "video conferencing mode" may also be referred to as a kind of audio pick up mode which is used during a video conference.

Depending on a set video conferencing mode, first speaker 108 may output a audio signal, e.g. a speech signal, of a video conference and/or the television sound signal corresponding to the sound of a currently viewed television program. It may be possible that the first speaker is outputting only the audio signal or only the television sound signal. However, it may also be possible that the audio signal of the video conference and the television sound signal of the television program are combined and output as a single sound signal by first speaker 108. In this case it is possible that the audio signal is attenuated with respect to the television sound signal. Alternatively, it is also possible that the television sound signal is attenuated with respect to the audio signal. Thus, a user using television set 102 for a video conference may still listen to the sound of a currently viewed television program.

Moreover, second speaker 112 included in remote control 104 may be switched on or off depending on the video conferencing mode. For example, in a certain video conferencing mode, the second speaker may be switched on whereas the first speaker 108 is configured to only output the television sound signal. In this case, a user may use remote control 104 as a telephone receiver. In order for a user to conveniently use remote control 104 as a telephone receiver, the second speaker 112 may be located on one side whereas the second microphone 116 may be located on another side opposed to the side where the second speaker 112 is located (see right-hand side of FIG. 1). Also, the shape of the remote control may be designed such as to be perceived as a telephone receiver.

Moreover, in television system 100 the first microphone 110 and second microphone 116 may be selectively activated depending on the video conferencing mode.

Details regarding the control of first speaker 108, first microphone 110, second speaker 112 and second microphone 116 are detailed below (cf. table 1 as well as FIGS. 2 to 5).

Regarding the picture displayed on display 106 various possibilities exist. The display may be operated in a first or second display mode. In the first display mode the television picture of a currently viewed television program and the video conferencing picture may be displayed simultaneously. This may e.g. be done in accordance with a split screen mode, a picture in picture (PiP) mode, a transparent mode, an overlapping/overlaying mode, a superimposing mode, and/or other suitable display modes for simultaneously displaying two video pictures. In the second display mode only the television picture included in the television signal may be displayed. In such cases viewers of a currently viewed television program may not be disturbed by the picture of the video conference. The selection of whether the display is operated in the first or second display mode may depend on the video conferencing mode. In so far, the term "video conferencing mode" may also be descriptive of the type (setting) of a display mode used during a video conference.

The video conferencing mode may be set based on a default setting, the default setting being user selectable. For example, television set 102 may have a user interface where the user is allowed to set various settings for a video conference. For example, the user may most of the time watch television alone. In such cases when a video conference call comes in the user may prefer to automatically see the other person on the display 106, e.g. in full screen mode or split screen mode. Therefore, the user may choose a default setting where display 106 is operated in full screen mode or in a split screen mode. In latter case, in one part of display 106 the currently viewed television program may be continued to be displayed whereas in another part of the display 106 the picture of the other person of the video conference may be displayed. On the other hand, if a user is typically watching television together with other people, the user may set the default setting such that no video picture of the video conference is displayed on display 106. In this case (which may also be referred to as "private video conferencing mode"), an incoming call may be signaled on the screen, e.g. by small graphical symbols, and/or via an acoustic signal. Therefore, other viewers of the television program may not be disturbed since the video picture of the other person of the video conference call will not be displayed on display 106. In this case, the default setting may also automatically switch on the second speaker 112 and activate second microphone 116, so that the user can have a private telephone conference using remote control 104 as a telephone receiver.

In a further embodiment it is also possible that the video conferencing mode is user selectable, wherein the user is prompted to select a video conferencing mode when initiating or receiving a call.

For example, in case a video conference call comes in, a graphical user interface (GUI) may be displayed on display 106 prompting the user to select whether to use a "private video conferencing mode" or a "public video conferencing mode". In a private video conferencing mode first speaker 108 may continue to output the television sound signal of the currently viewed television program. A user wanting to participate in the video conference may therefore not see the other person but use the remote control 104 as a telephone receiver as described above. When selecting the public video conferencing mode, the screen may be split. Moreover, the acoustic signal of the video conference may be output via speaker 108.

In a further embodiment (not shown) it may also be possible that remote control 104 comprises a display and/or a camera for video conferencing. In this case a video conference could be held by only using remote control 104.

The following table shows different video conferencing modes:

|  | TV | | | Commander/Remote Control | |
| --- | --- | --- | --- | --- | --- |
|  | Picture | First Micro-phone | First Speaker | Second Micro-phone | Second Speaker |
| $1^{st}$ mode: Private Video Conference (VC) | Split Screen | OFF | TV Audio | VC Audio | VC Audio |
| $2^{nd}$ mode: Public Video Conference (VC) | Split Screen | OFF | VC Audio | VC Audio | OFF |
| $3^{rd}$ mode: Public Video Conference (VC) | Split Screen | VC Audio | VC Audio | OFF | OFF |
| $4^{th}$ mode: Public Video Conference (VC) | Split Screen | VC Audio | VC Audio | VC Audio | OFF |
| $5^{th}$ mode: Private Telephone | TV | OFF | TV Audio | VC Audio | VC Audio |
| $6^{th}$ mode: Public Telephone | TV | OFF | VC Audio | VC Audio | OFF |
| $7^{th}$ mode: Public Telephone | TV | VC Audio | VC Audio | OFF | OFF |
| $8^{th}$ mode: Public Telephone | TV | VC Audio | VC Audio | VC Audio | OFF |

As can be seen in the first to fourth video conference mode the display of the television set displays a split screen. As mentioned above, alternatively to a split screen mode other modes are possible such as e.g. a picture in picture mode. In any case in the first to fourth video conferencing mode both, the picture of a currently viewed television program as well as the picture of a video conference is displayed.

According to the fifth to eighth video conferencing mode, only the picture of a currently viewed television program is displayed. In this case a viewer of a currently displayed television program may not be disturbed.

As can be seen, the first to fourth video conferencing modes essentially correspond to the fifth to eighth video conferencing modes the difference being in the kind of the picture displayed on the display of the television set. For example, as can be seen the settings detailed below with respect to the first and second microphones as well as those of the first and second speakers are the same for the first and fifth video conferencing mode. Moreover, the settings are the same for the second and sixth video conferencing mode. Therefore, only the first to fourth video conferencing modes will be described in detail. The setting according to the fifth to eighth should be clear from the table above.

According to the first video conferencing mode, the first microphone of the television set is not activated ("OFF"). Moreover, the first speaker at the television set outputs the television sound signal, i.e. the sound signal corresponding to a currently view television program. Still further, the second microphone at the remote control is activated ("ON") and the second speaker at the remote control is turned on and outputting the audio of the video conference. The first video conferencing mode may also be referred to as a "private video conferencing mode" since in a scenario where several people are watching television when a call is initiated the currently displayed television program will continue to be displayed without severe disturbances (only the picture is displayed in split screen mode). However, since the sound (audio signal) of the video conference is only output at the second speaker at the remote control, other viewers of the television program may continue listening to the television sound.

According to the second video conferencing mode, the first microphone at the television set is turned off. Moreover, the first speaker at the television set outputs the audio of the video conference (audio signal). Still further, the second microphone at the remote control may be activated and, therefore, pick up sound signals, e.g. the audio for the video conference. Still further the second speaker at the remote control is switched off. The second video conferencing mode may therefore be refer to as a "public video conferencing mode" since a plurality of viewers sitting before the television may participate in the video conference and may follow the conversation of the video conference.

According to the third video conferencing mode the first microphone at the television set is activated, the first speaker outputs the video conferencing audio (e.g. speech), the second microphone at the remote control is switched off, and the second speaker at the remote control is also switched off. This third video conferencing mode may also be referred to as a "public video conferencing mode" since a plurality of users can conveniently participate in the video conference.

According to the fourth video conferencing mode the first microphone at the television set is activated, the first speaker at the television set is outputting the video conferencing audio (e.g. speech), the second microphone at the remote control is activated and the second speaker at the remote control is switched off.

The fourth video conferencing mode may also be referred to as a public video conferencing mode since several people sitting in front of the television set may participate in the video conference (they can listen to the speech of the remote person or persons participating in the video conference).

With respect to the fourth video conferencing mode and the eighth video conferencing mode it is noted that the first and the second microphones are activated and picking up sound signals from the surrounding. Therefore, a "microphone array" may be realized. This may be used for improving the quality of the audio pickup. For example, beamforming could be used.

Further, the first and second microphones may be selectively used wherein the microphone picking up a stronger acoustic signal (e.g. louder speech), which is not the loudspeaker signal echo, wins, i.e. is solely used. The other microphone may be cancelled and/or muted.

Although FIG. 1 shows that the remote control 104 has a second speaker 112, it should be noted that this is not necessary. In a further embodiment (not shown), remote control 104 may not have a speaker.

Figure 2:
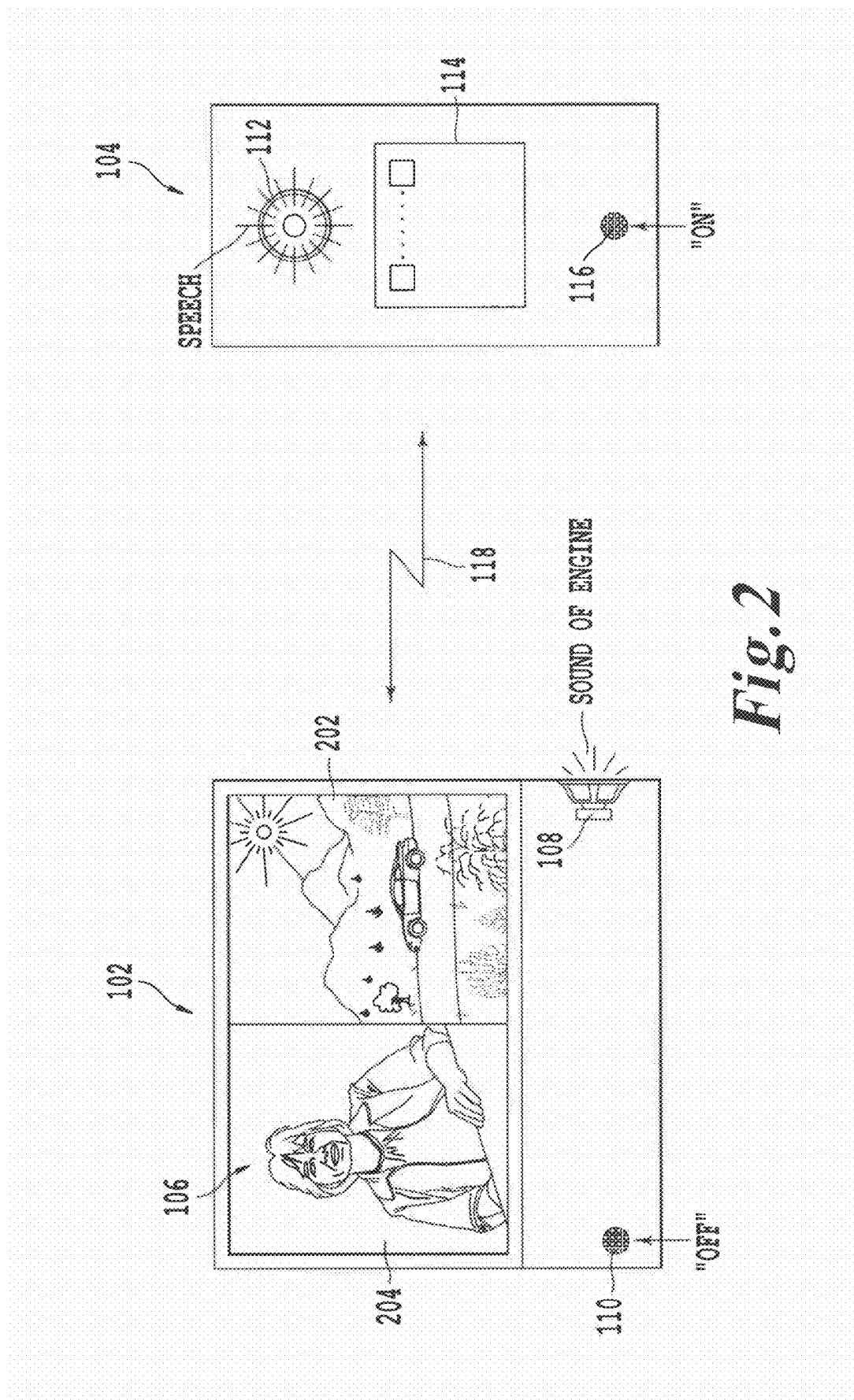
FIG. 2 shows the television system operated in a first video conferencing mode.

FIG. 2 depicts the first video conferencing mode in accordance with the above table. As can be seen the first microphone 110 is switched off. Further, the first speaker 108 outputs the sound of a currently viewed television program. As depicted at 202 in the currently view television program a car is driving. Therefore, the first loudspeaker 108 outputs the sound of an engine.

As can be further seen, the second speaker 112 of remote control 104 outputs the audio signal of a video conference. Moreover, the second microphone 116 at remote control 104 is activated.

As can be further seen, the display 106 is displaying a split screen wherein the left part at 204 the picture of a remote person participating in the video conference is displayed. On the right-hand side as depicted at 202 the picture of a currently view television program is displayed.

Figure 3:
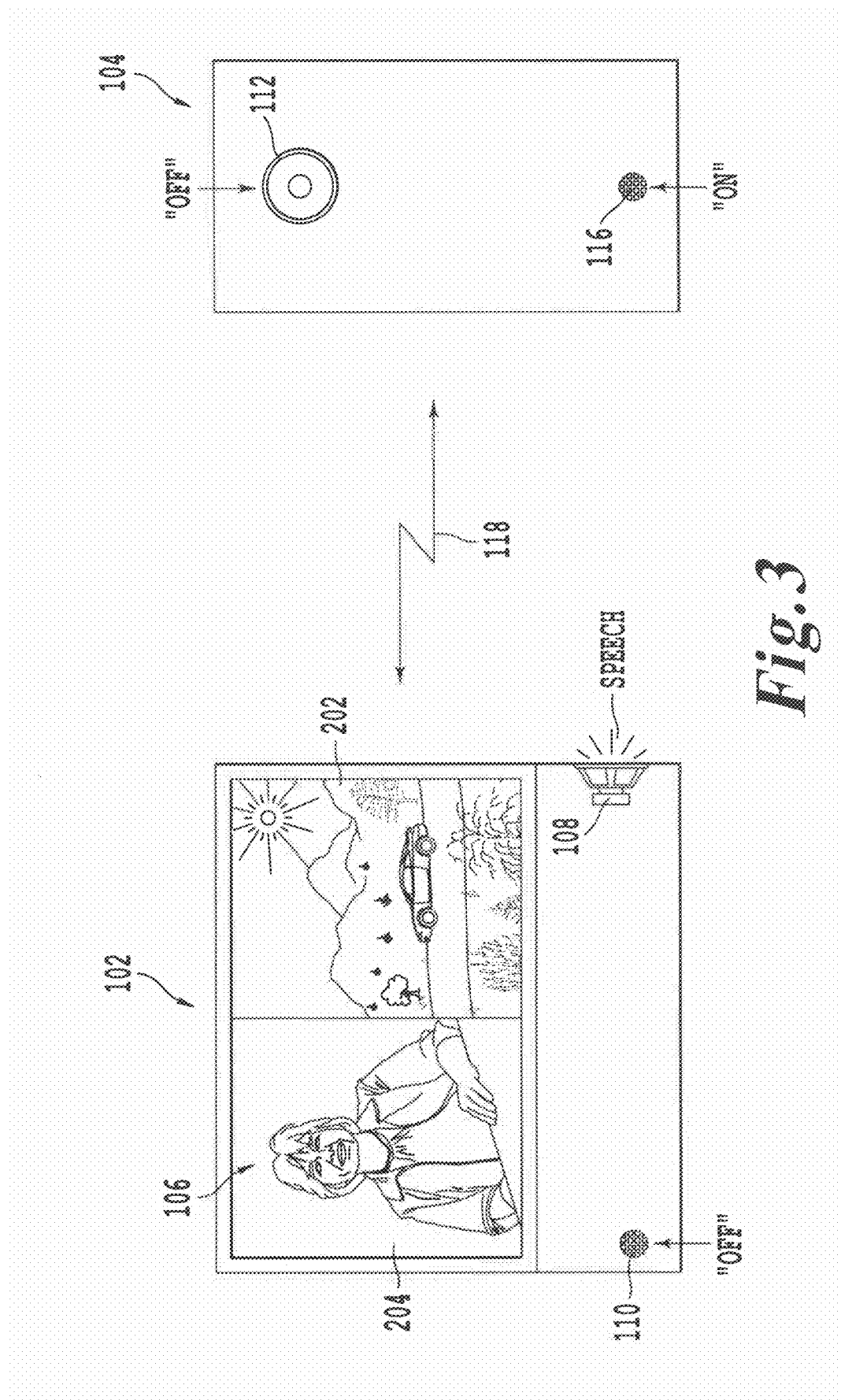
FIG. 3 shows the television system operated in a second video conferencing mode.

FIG. 3 depicts the second video conferencing mode of the above table. As can be seen, first microphone 110 is switched off. Further, first speaker 108 outputs the speech of the video conference of the remote person displayed at 204. Further, the second speaker 112 of remote control 104 is switched off and second microphone 116 is switched on.

Figure 4:
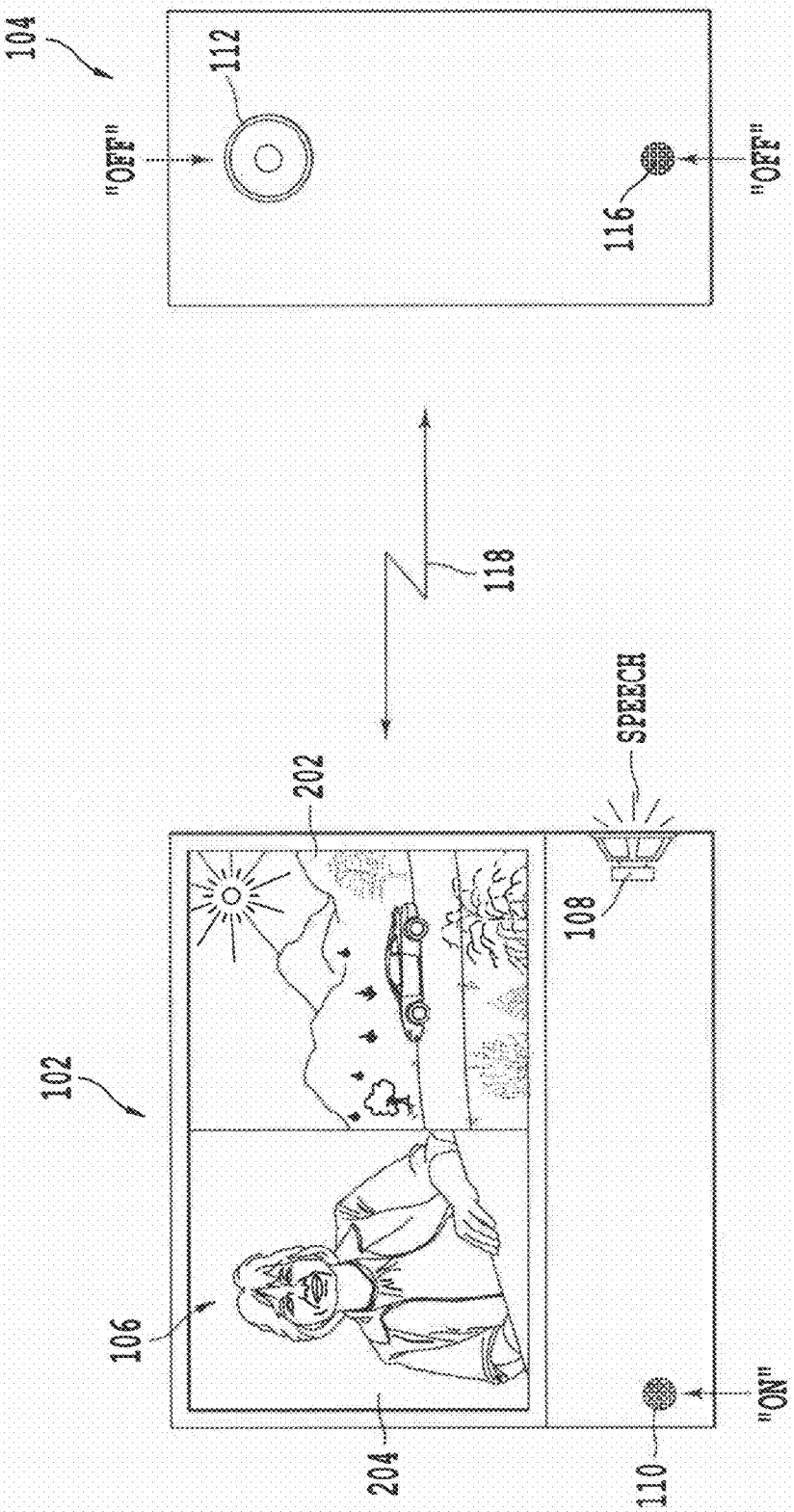
FIG. 4 shows the television system operated in a third video conferencing mode.

FIG. 4 depicts the third video conferencing mode shown in the above table. As can be seen, in this third video conferencing mode, first microphone 110 is switched on, the first speaker 108 outputs the acoustic signal (e.g. speech) of the video conference, the second microphone 116 is switched off and the second speaker 112 is switched off.

Figure 5:
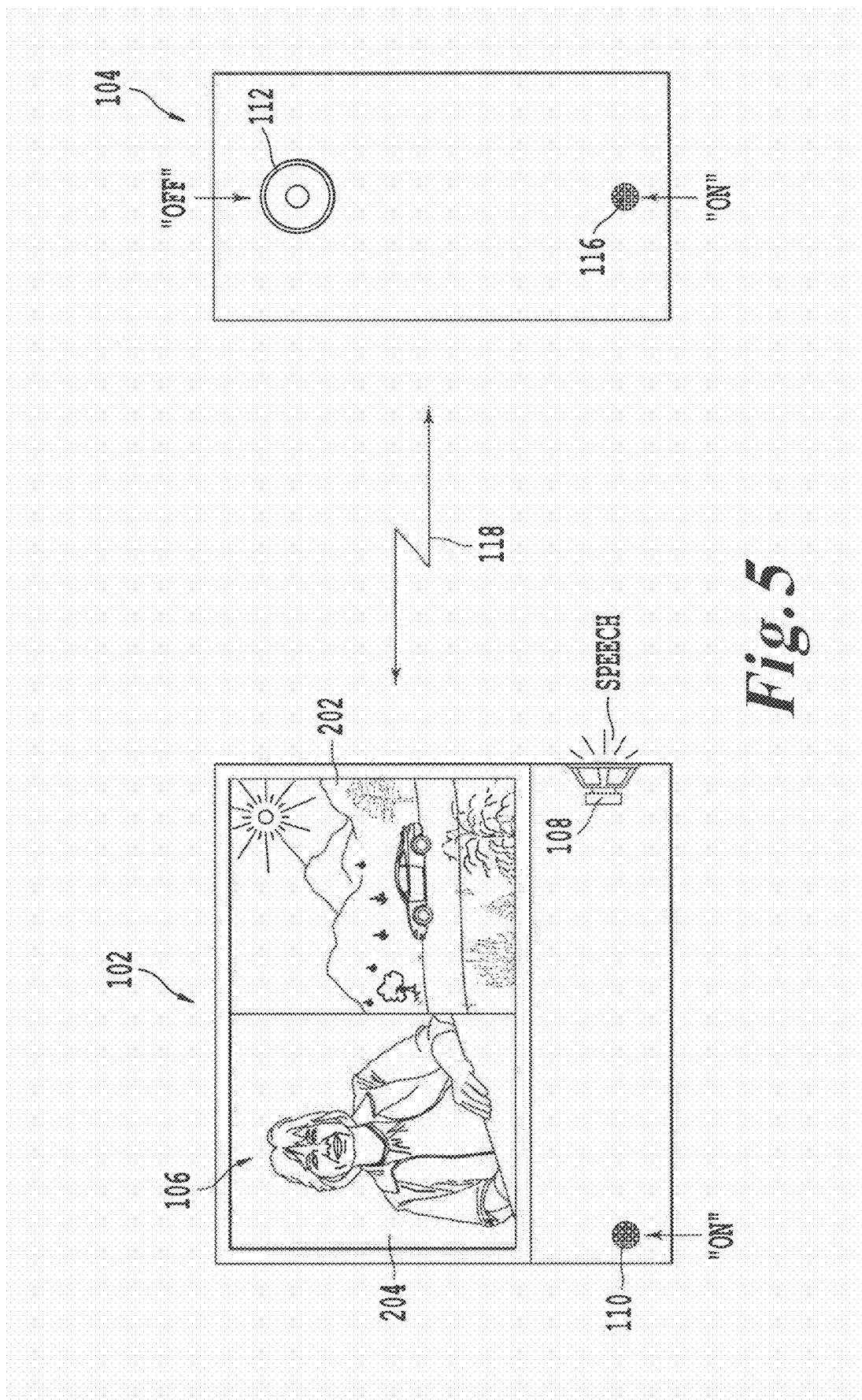
FIG. 5 shows the television system operated in a fourth video conferencing mode.

Still further, FIG. 5 depicts the fourth video conferencing mode shown in the above table. As can be seen in the fourth video conferencing mode, the first microphone 110 is switched on (activated). Further, the first speaker 108 outputs the speech of the video conference. Moreover, the second speaker 112 is switched off and the second microphone 116 is switched on.

Figure 6:
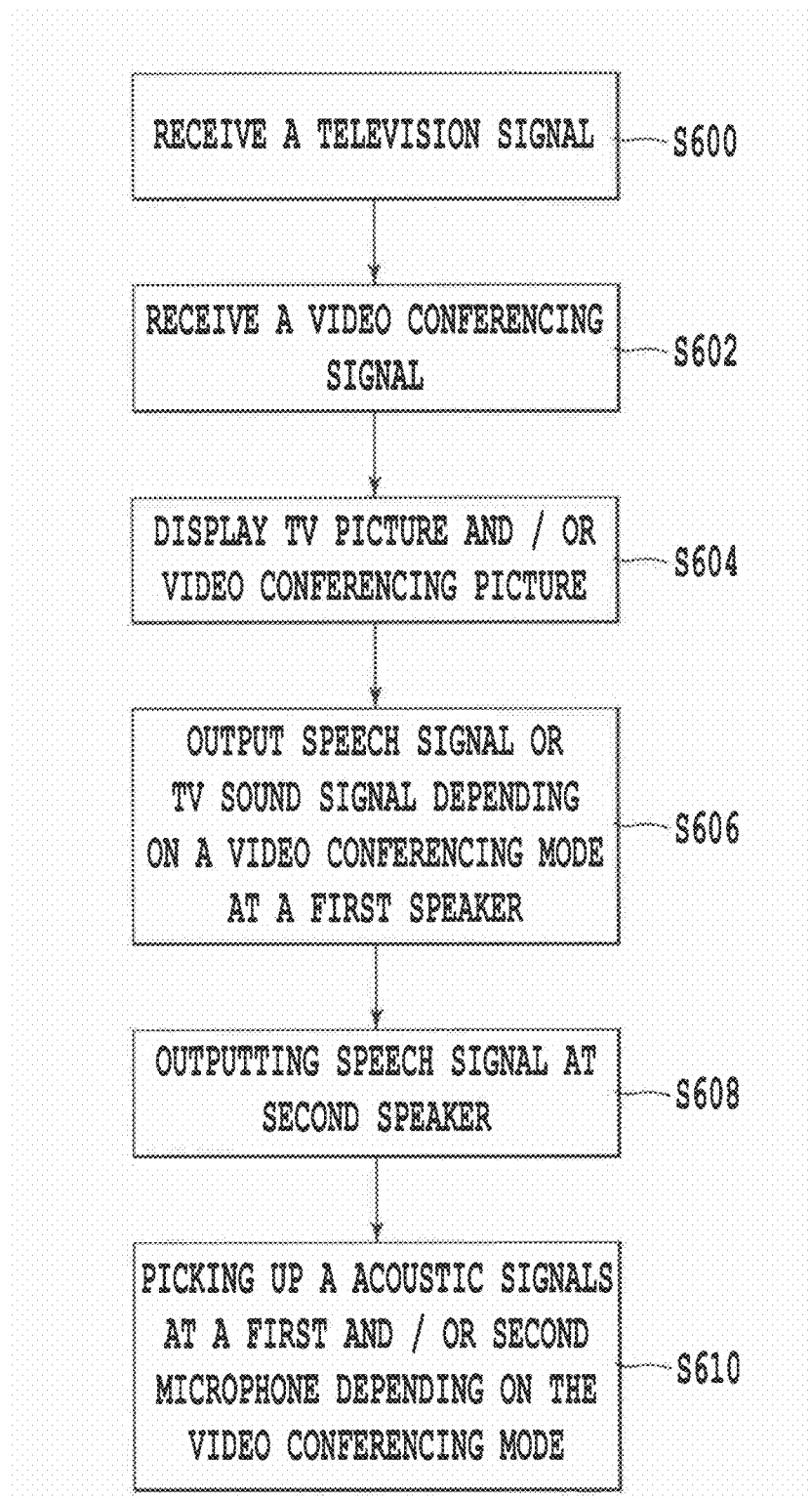
FIG. 6 depicts a flowchart of a method according to an embodiment of the invention.

FIG. 6 shows a flowchart of a method for operating a television system. At S600, a television signal is received. Further, at S602, a video conference signal is received.

At S604 the television picture corresponding to the television signal and/or the video conferencing picture of a video conference is displayed. As detailed above, the television picture and video conferencing picture may be displayed simultaneously in a split screen mode, a picture in picture mode or other modes as explained above.

At S606, an audio signal of the video conference and/or a television sound signal is output at a first speaker. Thereby, the first speaker may output the audio signal and/or the television sound signal depending on a set video conferencing mode.

At S608, the audio signal of the video conference is either output or not output depending on the video conferencing mode. In other words, the second speaker may be switched on or off depending on the video conferencing mode. In case it is switched on, the second speaker located in a remote control outputs the audio signal of the video conference.

At S610, acoustic signals are picked up with a first microphone included in a television set and/or with a second microphone included in the remote control, wherein the first and second microphones are selectively activated depending on the video conferencing mode. As detailed above, only one of the microphones may be activated. Alternatively, it is also possible that both of the microphones are activated. Still further, in case the user wishes to have more privacy for a moment, both of the microphones may of course also be muted.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A television system, comprising:
a television set including a display and an input adapted to receive a television signal and a video conferencing signal, wherein the display is configured to display a television picture corresponding to the television signal and further configured to display a video conferencing picture of a video conference, the television set further including a first speaker adapted to output an audio signal of the video conference and a television sound signal included in said television signal, the television set further including a first microphone adapted to be used for said video conference; and
a remote control adapted to control the television set and including a second microphone, wherein
the first speaker is adapted to output said audio signal and/or said television sound signal depending on a video conferencing mode,
the first and second microphones are adapted to be selectively activated depending on said video conferencing mode, and
when the video conferencing mode corresponds to a first video conferencing mode, the first microphone is not activated, the first speaker outputs the television sound signal, the second microphone is activated, and a second speaker is switched on and outputs said audio signal.

2. The television system of claim 1, wherein the remote control comprises the second speaker, wherein the second speaker is adapted to be switched on or off depending on said videoconferencing mode.

3. The television system of claim 1, wherein the video conferencing mode is set based on default setting, the default setting being user selectable.

4. The television system of claim 1, wherein the video conferencing mode is user selectable, wherein the user is prompted to select a video conferencing mode when initiating or receiving a call.

5. A television system comprising:
a television set including a display and an input adapted to receive a television signal and a video conferencing signal, wherein the display is configured to display a television picture corresponding to the television signal and further configured to display a video conferencing picture of a video conference, the television set further including a first speaker adapted to output an audio signal of the video conference and a television sound signal included in said television signal, the television set further including a first microphone adapted to be used for said video conference; and
a remote control adapted to control the television set and including a second microphone, wherein
the first speaker is adapted to output said audio signal and/or said television sound signal depending on a video conferencing mode,
the first and second microphones are adapted to be selectively activated depending on said video conferencing mode, and
when the video conferencing mode corresponds to a first video conferencing mode, the first microphone is not activated, the first speaker outputs the audio signal, the second microphone is activated, and a second speaker is switched off.

6. A television system comprising:
a television set including a display and an input adapted to receive a television signal and a video conferencing signal, wherein the display is configured to display a television picture corresponding to the television signal and further configured to display a video conferencing picture of a video conference, the television set further including a first speaker adapted to output an audio signal of the video conference and a television sound signal included in said television signal, the television set further including a first microphone adapted to be used for said video conference; and
a remote control adapted to control the television set and including a second microphone, wherein
the first speaker is adapted to output said audio signal and/or said television sound signal depending on a video conferencing mode,
the first and second microphones are adapted to be selectively activated depending on said video conferencing mode, and
when the video conferencing mode corresponds to a first video conferencing mode, the first microphone is activated, the first speaker outputs the audio signal, the second microphone is not activated, and a second speaker is switched off.

7. A television system comprising:
a television set including a display and an input adapted to receive a television signal and a video conferencing signal, wherein the display is configured to display a television picture corresponding to the television signal and further configured to display a video conferencing picture of a video conference, the television set further including a first speaker adapted to output an audio signal of the video conference and a television sound signal included in said television signal, the television set further including a first microphone adapted to be used for said video conference; and
a remote control adapted to control the television set and including a second microphone, wherein
the first speaker is adapted to output said audio signal and/or said television sound signal depending on a video conferencing mode,
the first and second microphones are adapted to be selectively activated depending on said video conferencing mode, and when the video conferencing mode corresponds to a first video conferencing mode, the first microphone is activated, the first speaker outputs the audio signal, the second microphone is activated, and a second speaker is switched off.

8. A television system comprising:
a television set including a display and an input adapted to receive a television signal and a video conferencing signal, wherein the display is configured to display a television picture corresponding to the television signal and further configured to display a video conferencing picture of a video conference, the television set further including a first speaker adapted to output an audio signal of the video conference and a television sound signal included in said television signal, the television set further including a first microphone adapted to be used for said video conference; and
a remote control adapted to control the television set and including a second microphone, wherein
the first speaker is adapted to output said audio signal and/or said television sound signal depending on a video conferencing mode,
the first and second microphones are adapted to be selectively activated depending on said video conferencing mode, and
the display is configured to be operated in a first and second display mode, wherein in the first display mode the television signal and the video conferencing picture are displayed simultaneously in a split screen mode, a picture-in-picture mode, a transparent mode, an overlapping mode and/or another suitable display mode for simultaneously displaying two pictures, and wherein in the second display mode only the television picture is displayed, wherein the selection of whether the display is operated in the first or second display mode depends on the video conferencing mode.

9. A television set, comprising:
a display;
an input adapted to receive a television signal and a video conferencing signal, wherein the display is configured to display a television picture corresponding to the television signal and further configured to display a video conferencing picture of a video conference;
a first speaker adapted to output an audio signal of the video conference and a television sound signal included in said television signal;
a first microphone adapted to be used for said video conference; and
a remote control adapted to control the television set and including a second microphone, wherein
the first speaker is adapted to output said audio signal and/or said television sound signal depending on a video conferencing mode, the first and second microphones are adapted to be selectively activated depending on said video conferencing mode, and
the television set is adapted to control a second speaker and the second microphone depending on a user selectable setting, the control being performed via a wireless signal transmitted from the television set to the remote control.

10. The television set of claim 9, wherein the remote control comprises a second speaker, wherein the second speaker is adapted to be switched on or off depending on said video conferencing mode.

11. A method for operating a television system, comprising:
receiving a television signal and a video conferencing signal,
displaying a television picture corresponding to the television signal and/or a video conferencing picture of a video conference,
outputting, by a first speaker included in a television set, an audio signal of the video conference and/or a television sound signal included in said television signal, wherein the first speaker outputs said audio signal and/or said television sound signal depending on a video conferencing mode;
picking up acoustic signals with a first microphone included in the television set and with a second microphone included in the remote control, wherein the first and second microphones are selectively activated depending on said video conferencing mode, wherein,
when the video conferencing mode corresponds to a first video conferencing mode, the first microphone is not activated, the first speaker outputs the television sound signal, the second microphone is activated, and a second speaker is switched on and outputs said audio signal.

12. The method of claim 11, further comprising:
outputting, by the second speaker included in a remote control, said audio signal, wherein the second speaker is switched on or off depending on said video conferencing mode.

13. The method of claim 11, wherein, when the video conferencing mode corresponds to a second video conferencing mode, the first microphone is not activated, the first speaker outputs the audio signal, the second microphone is activated, and the second speaker is switched off.

14. The method of claim 11, wherein, when the video conferencing mode corresponds to a second video conferencing mode, the first microphone is activated, the first speaker outputs the audio signal, the second microphone is not activated, and the second speaker is switched off.

15. The method of claim 11, wherein, when the video conferencing mode corresponds to a second video conferencing mode, the first microphone is activated, the first speaker outputs the audio signal, the second microphone is activated, and the second speaker is switched off.

* * * * *